Aug. 11, 1931.   C. E. WITTE   1,818,371
CHARGE FORMING DEVICE
Filed Oct. 26, 1927
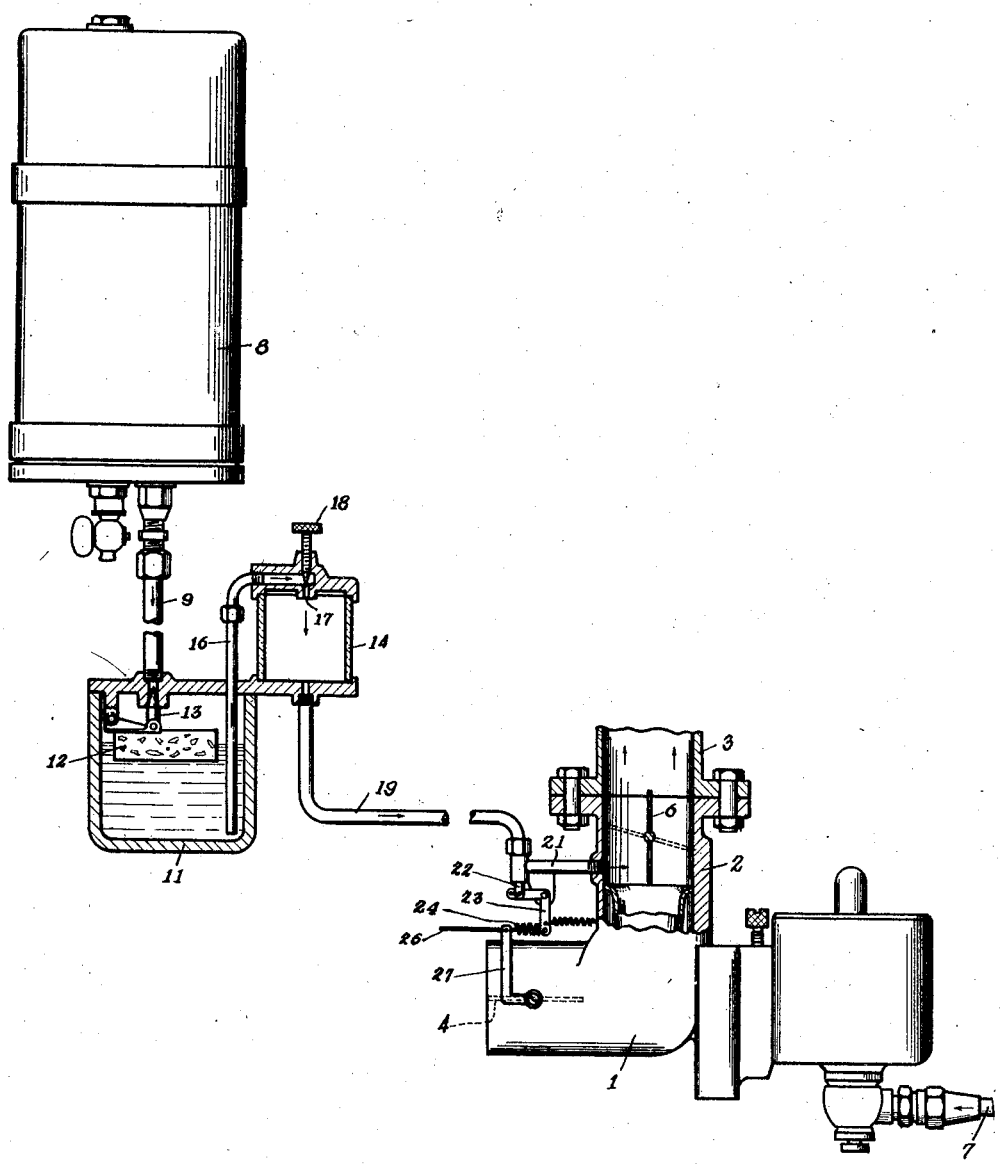
INVENTOR.
CARL EMIL WITTE.
BY
Munn +Co?
ATTORNEYS.

Patented Aug. 11, 1931

1,818,371

UNITED STATES PATENT OFFICE

CARL EMIL WITTE, OF SAN FRANCISCO, CALIFORNIA

CHARGE FORMING DEVICE

Application filed October 26, 1927. Serial No. 228,911.

The present invention relates to improvements in charge forming devices for internal combustion engines, and has particular reference to a means for mixing a small amount of water into the charge as it is drawn from the carburetor through the intake into the combustion chamber of the engine. It is particularly proposed to arrange this means in such a manner that the water is supplied to the gas and air mixture in proportion to the amount of mixture drawn through the intake. It is further proposed to provide means rendering the water feed automatically inactive when the choker valve forming a part of the carburetor of an engine is closed for starting purposes. It is further proposed to provide means whereby the amount of water fed into the intake can be regulated and observed for the purpose of allowing best results to be obtained.

Further objects and advantages of my invention will appear as the specification proceeds.

The preferred form of my invention is illustrated in the accompanying drawing, in which the entire arrangement is shown partly in side elevation and partly in vertical section.

While I have shown only the preferred form of the invention I wish to have it understood that various changes or modifications may be made within the scope of the claims hereto attached without departing from the spirit of the invention.

The carburetor 1 shown in the drawing may be of any suitable type and construction, and is arranged to allow the suction of an engine, not shown in the drawing, to become active upon the pipe 2 which connects with the intake pipe 3. The pipe 2 forms part of the carburetor and is provided at its intake end with a choker valve 4, while a throttle valve 6 is arranged at the other end of the pipe 2. Gasoline or other fuel enters the carburetor through the pipe 7 and is guided into the pipe 2 in a well-known manner to be mixed with the air passing through the pipe 2.

The construction thus far described is conventional and no claims are made for the same. My invention comprises in its principal feature means for admitting water into the pipe 2 in advance of the throttle 6, so that the amount of water admitted varies according to the position of the throttle valve.

My water admitting means comprises a water tank 8 which discharges water by gravity through a pipe 9 into the float chamber 11. Water is maintained at a constant elevation in this chamber by means of a float 12 which operates a needle valve 13 controlling the opening of the conduit between the main tank 8 and the float chamber.

Fixed relative to the float chamber 11, and in operative proximity thereto, I provide a second chamber 14 into which water is admitted from the float chamber through the pipe 16, which latter extends from the lower part of the float chamber to the top of the chamber 14, and discharges into the latter chamber from the top through a port 17, the area of which is controlled by means of a needle 18. The wall of the chamber 14 is made of transparent material, so that the amount of water passing through the chamber 14 may be observed from the outside.

It should be particularly noticed that the amount of water passing through the sight chamber 14 is largely controlled by the relative elevations of the sight chamber and the float chamber, and that the relative elevations should be arranged in such a manner that best results are obtained under given conditions.

The bottom of the sight chamber 14 connects to a conduit 19 which leads to a pipe 21 which latter in turn is connected into the pipe 2, preferably below the throttle valve 6, so that the suction active on the water in the float chamber varies in the same manner as the suction active on the air and gas mixture passing through the pipe 2.

The port area of the conduit 19 is controlled by a needle valve 22 operated by a bell crank lever 23, which latter is manipulated by means of a spring 24 connecting to the rod 26, which may be actuated from the driver's seat. The rod 26 also operates the choke valve 4 through an arm 27, and the valve 22 and the choker are arranged so that when the choker is closed the valve 22 also closes. It appears, therefore, when the choker is closed for the purpose of starting the engine, no water is admitted into the pipe 2.

The operation of my invention will be readily understood from the foregoing description. As the engine is running suction is created in the intake manifold 3, and the pipe 2, which suction becomes active on the gasoline mixture of the carburetor and also through the conduit 19 on the water in the float chamber 11, which is held at a constant level by means of the float 12 and the needle valve 13. Under the influence of the suction the water rises in the pipe 16 and passes the needle valve 18 to drip into the chamber 14. Here the quantity of water passing may be observed through the transparent sides of the latter chamber. From this chamber the water passes through the conduit 19, and the pipe 21, into the pipe 2, mixes with the gasoline and air mixture, and is drawn into the combustion chamber of the engine. The flow of water may be nicely adjusted by means of the needle valve 18 and is automatically discontinued when the choker 4 is closed. The amount of water entering the pipe 2 varies directly in proportion to the amount of gas and air mixture drawn through the carburetor, since both are controlled by the throttle 6.

I claim:

1. In an internal combustion engine, a carburetting device, an air intake for said carburetor, a water vessel, a pipe connection between the vessel and the intake allowing the suction of the engine to draw on the water in the vessel, a choker associated with the carburetor, a valve in the pipe connection and a common control for the valve and the choker.

2. In combination, a carburetor for an internal combustion engine having a throttle valve controlling the outlet thereof, a water vessel and a pipe connection between the water vessel and the carburetor and entering the latter immediately below the throttle valve, the pipe connection including means for independently observing and controlling the water feed.

3. In combination, a carburetor for an internal combustion engine having a conduit including a horizontal intake section and a vertical outlet section, a throttle valve in the latter section for controlling the outlet, a water vessel and a pipe connection between the water vessel and the carburetor and entering the latter in its vertical section below and in the immediate proximity of the throttle valve.

CARL EMIL WITTE.